(12) United States Patent
Hayami et al.

(10) Patent No.: US 10,449,891 B2
(45) Date of Patent: Oct. 22, 2019

(54) MONITORING DEVICE AND LIGHT DISTRIBUTION CONTROL DEVICE FOR LAMP

(71) Applicant: KOITO MANUFACTURING CO., LTD., Tokyo (JP)

(72) Inventors: Toshihisa Hayami, Shizuoka (JP); Kazuhiro Suzuki, Shizuoka (JP); Yusuke Funami, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 16/005,000

(22) Filed: Jun. 11, 2018

(65) Prior Publication Data
US 2018/0354407 A1    Dec. 13, 2018

(30) Foreign Application Priority Data

Jun. 13, 2017 (JP) ................. 2017-115527

(51) Int. Cl.
*B60Q 1/08* (2006.01)
*B60Q 1/12* (2006.01)

(52) U.S. Cl.
CPC ............. *B60Q 1/08* (2013.01); *B60Q 1/12* (2013.01); *B60Q 2300/122* (2013.01); *B60Q 2300/126* (2013.01)

(58) Field of Classification Search
CPC ........ B60Q 2300/122; B60Q 2300/112; B60Q 2300/128; B60Q 2300/124; B60Q 2300/142; B60Q 2300/054; B60Q 2300/114; B60Q 2300/126; B60Q 2300/134; B60Q 2300/21; B60Q 2300/322; B60Q 2300/335; B60Q 2300/336; B60Q 1/12; B60Q 1/122; B60Q 1/18; B60Q 1/14; B60Q 2400/50
See application file for complete search history.

(56) References Cited

U.S. PATENT DOCUMENTS 7,175,319 B2 * 2/2007 Tajima ................... B60Q 1/076
362/465
9,877,364 B2    1/2018 Hong et al.
(Continued)

FOREIGN PATENT DOCUMENTS

CN    101272654 A    9/2008
CN    101377274 A    3/2009
(Continued)

OTHER PUBLICATIONS

Office Action dated Jul. 8, 2019 in Chinese Application No. 201810607213.9.

*Primary Examiner* — Tung X Le
*Assistant Examiner* — Boma Alaeddini
(74) *Attorney, Agent, or Firm* — Sughrue Mion, PLLC (57) ABSTRACT

A monitoring device includes a comparison unit and a clock control unit. The comparison unit is configured to compare a signal level of a transmission signal and a signal level of a monitoring signal that has received the transmission signal with each other at a timing synchronized with a clock signal. The clock control unit is configured to detect the signal level of the monitoring signal and synchronize the clock signal with a timing when the signal level of the monitoring signal changes.

4 Claims, 8 Drawing Sheets

(56) References Cited

U.S. PATENT DOCUMENTS

| | | | |
|---|---|---|---|
| 2002/0163794 A1* | 11/2002 | Hayami | B60Q 1/12 |
| | | | 362/40 |
| 2009/0059608 A1* | 3/2009 | Yamazaki | B60Q 1/12 |
| | | | 362/466 |
| 2009/0162065 A1 | 6/2009 | Mizutani et al. | |
| 2018/0180978 A1* | 6/2018 | Yamada | H05B 33/0815 |

FOREIGN PATENT DOCUMENTS

| | | |
|---|---|---|
| CN | 101466052 A | 6/2009 |
| JP | 2008-306456 A | 12/2008 |
| WO | 2008/113696 A1 | 9/2008 |

* cited by examiner

MONITORING DEVICE AND LIGHT DISTRIBUTION CONTROL DEVICE FOR LAMP

INCORPORATION BY REFERENCE

The disclosure of Japanese Patent Application No. 2017-115527 filed on Jun. 13, 2017 including the specification, drawings and abstract is incorporated herein by reference in its entirety.

BACKGROUND

1. Technical Field

The disclosure relates to a monitoring device that monitors a transmission signal, and a light distribution control device that is designed for use in a lamp for a vehicle and that is equipped with the monitoring device.

2. Description of Related Art

A headlamp for a motor vehicle may adopt a light distribution control system in which an actuator for adjusting an optical axis of the lamp and a vehicle ECU (an electronic control unit) that is provided on a body of the motor vehicle are connected to each other by a local interconnect network (an LIN) and light distribution of the lamp is electronically controlled through transmission/reception of a signal between the actuator and the vehicle ECU. For example, there is configured an on-demand system in which an information signal representing a current light distribution state is transmitted from the actuator in accordance with a request from the vehicle ECU and the vehicle ECU transmits a control signal for controlling the actuator based on this transmitted information signal toward the actuator.

In this system, when an abnormality occurs in the information signal that is transmitted from the actuator (hereinafter referred to as a transmission signal), it is difficult to perform light distribution control with accuracy. Therefore, it is preferable to provide the actuator with a monitoring device for monitoring the transmission signal. For example, as described in Japanese Patent Application Publication No. 2008-306456 (JP 2008-306456 A), it is conceivable to monitor whether or not a transmission signal has been normally transmitted, by detecting the transmitted transmission signal as a monitoring signal through echo back and comparing the detected monitoring signal with the transmission signal that has not been transmitted yet.

SUMMARY

In this type of system, when a parasitic capacitance is generated in a transmission line of the transmission signal, for example, part of the foregoing LIN, monitoring may not be carried out with accuracy due to the parasitic capacitance. For instance, although a concrete example will be described later, an electric charge resulting from noise is accumulated in a parasitic capacitance when this parasitic capacitance exists in the LIN in the case where the noise is applied to the LIN. This electric charge is superimposed on the transmitted transmission signal, namely, the detected monitoring signal. Therefore, the level of the monitoring signal is changed by the electric charge, and the transmission signal that has not been transmitted yet and the monitoring signal cannot be correctly compared with each other. As a result, it is difficult to carry out monitoring with accuracy.

The disclosure provides a monitoring device capable of monitoring a transmission signal with accuracy, and a light distribution control device for a lamp.

A monitoring device according to a first aspect of the disclosure includes a comparison unit and a clock control unit. The comparison unit is configured to compare a signal level of a transmission signal and a signal level of a monitoring signal that has received the transmission signal with each other at a timing synchronized with a clock signal. The clock control unit is configured to detect the signal level of the monitoring signal and synchronize the clock signal with a timing when the signal level of the monitoring signal changes.

A light distribution control device for a lamp according to a second aspect of the disclosure includes a vehicle ECU that is mounted in a vehicle, and an actuator that is configured to perform light distribution control of swiveling and/or leveling of the lamp for the vehicle. The light distribution control device is configured to perform the light distribution control through transmission/reception of a signal between the vehicle ECU and the actuator. The light distribution control device includes the monitoring device that monitors a transmission signal that is transmitted to the vehicle ECU from the actuator.

According to each of the aspects of the disclosure, the transmission signal can be monitored with accuracy despite a delay caused in the monitoring signal when the transmission signal and the monitoring signal are compared with each other in synchronization with the clock signal, by synchronizing the clock signal with the change in the signal level of the monitoring signal. Thus, normal light distribution control of the lamp for the vehicle can be realized.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein.

DETAILED DESCRIPTION OF EMBODIMENT

Figure 1:
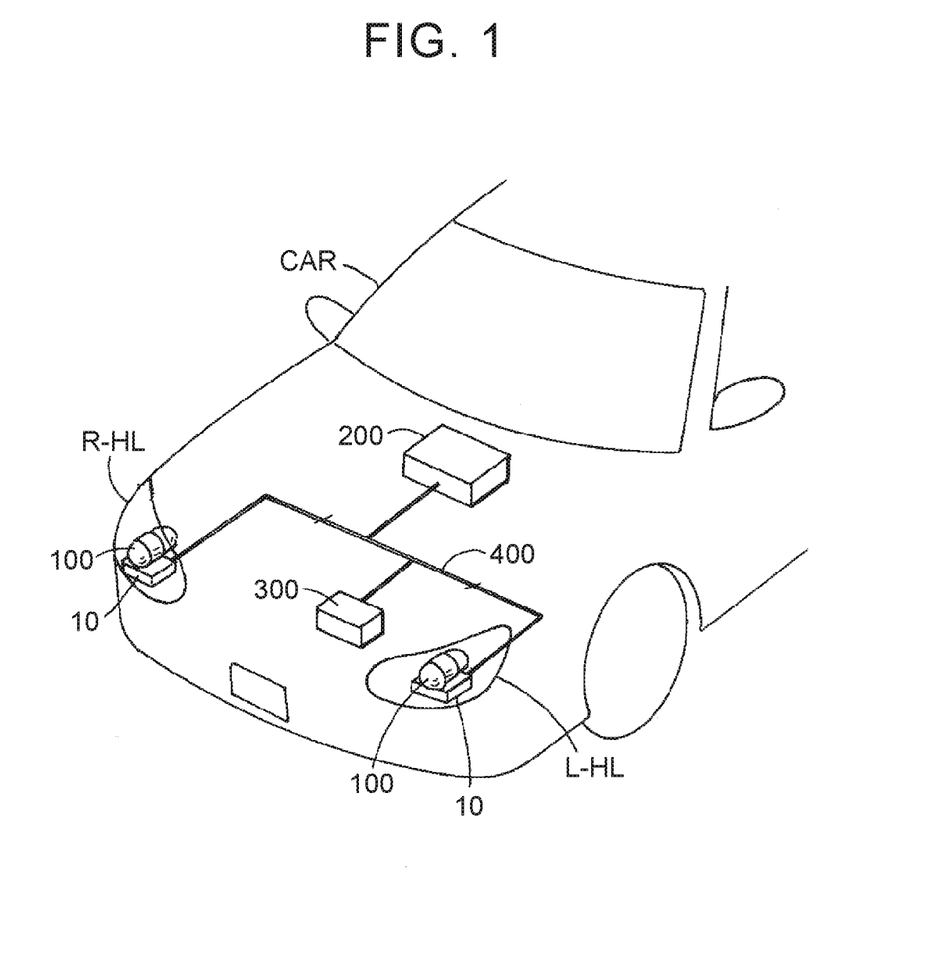
FIG. 1 is a conceptual view of a light distribution control device in which a monitoring device according to the disclosure is installed.

Next, the embodiment of the disclosure will be described with reference to the drawings. FIG. 1 is a conceptual configuration view according to the embodiment of the disclosure that is applied to right and left headlamps R-HL and L-HL of a motor vehicle CAR. A lamp unit (hereinafter referred to as an LU) 100 and a swiveling actuator (hereinafter referred to as an SA) 10 are disposed in each of the headlamps R-HL and L-HL. Swiveling control of the LU 100 can be performed by driving this SA 10.

The SA 10 of each of the headlamps R-HL and L-HL is electrically connected to an in-vehicle battery (hereinafter referred to as a BAT) 300, and is connected to a vehicle electronic control unit (hereinafter referred to as a vehicle ECU) 200, which controls respective components of the motor vehicle in a centralized manner, via an LIN 400. The SA 10 performs swiveling control of the LU 100 by transmitting/receiving a predetermined signal to/from the vehicle ECU 200 via the LIN.

Figure 2A:
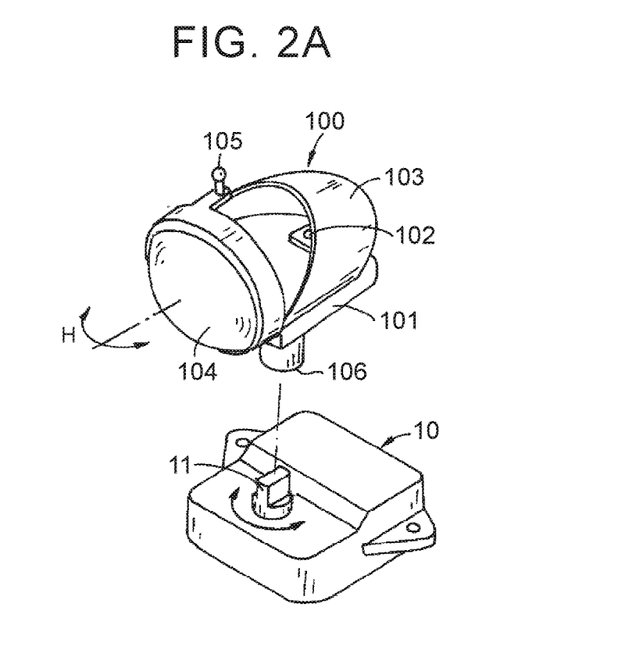
FIG. 2A is a conceptual configuration view of an actuator.

FIG. 2A shows the conceptual configuration of the SA 10. According to a configuration example shown in this drawing, the LU 100 has a base 101 that is mounted with a light-emitting diode (an LED) 102, a reflector 103 reflects light emitted from the LED 102, and a projection lens 104 radiates the reflected light forward with respect to the motor vehicle. A ball shaft 105 that serves as a tilting fulcrum is erected at an upper portion of this LU 100, and a coupling shaft 106 that is coupled to the SA 10 is provided at a lower portion of this LU 100.

The SA 10 is arranged below the LU 100, and an output shaft 11 that is directed upward is coupled to the coupling shaft 106 of the LU 100. When the SA 10 is driven, the output shaft 11 is axially rotated. By rotating this output shaft 11, the LU 100 is turned in a horizontal direction H to perform swiveling control of an optical axis of the LU.

Figure 2B:
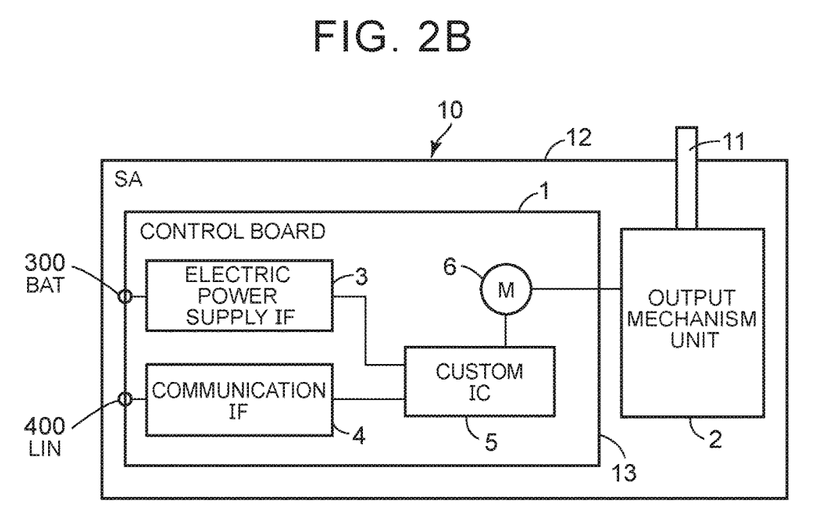
FIG. 2B is an internal configuration view of the actuator.

FIG. 2B shows the internal configuration of the SA 10. A control unit 1 and an output mechanism unit 2 are internally mounted in a casing 12. The control unit 1 has an electric power supply IF unit 3, a communication IF unit 4, a custom IC 5, and a motor 6. The control unit 1 drives the motor 6, and the output mechanism unit 2 to which this motor 6 is coupled rotationally drives the output shaft 11.

Figure 3:
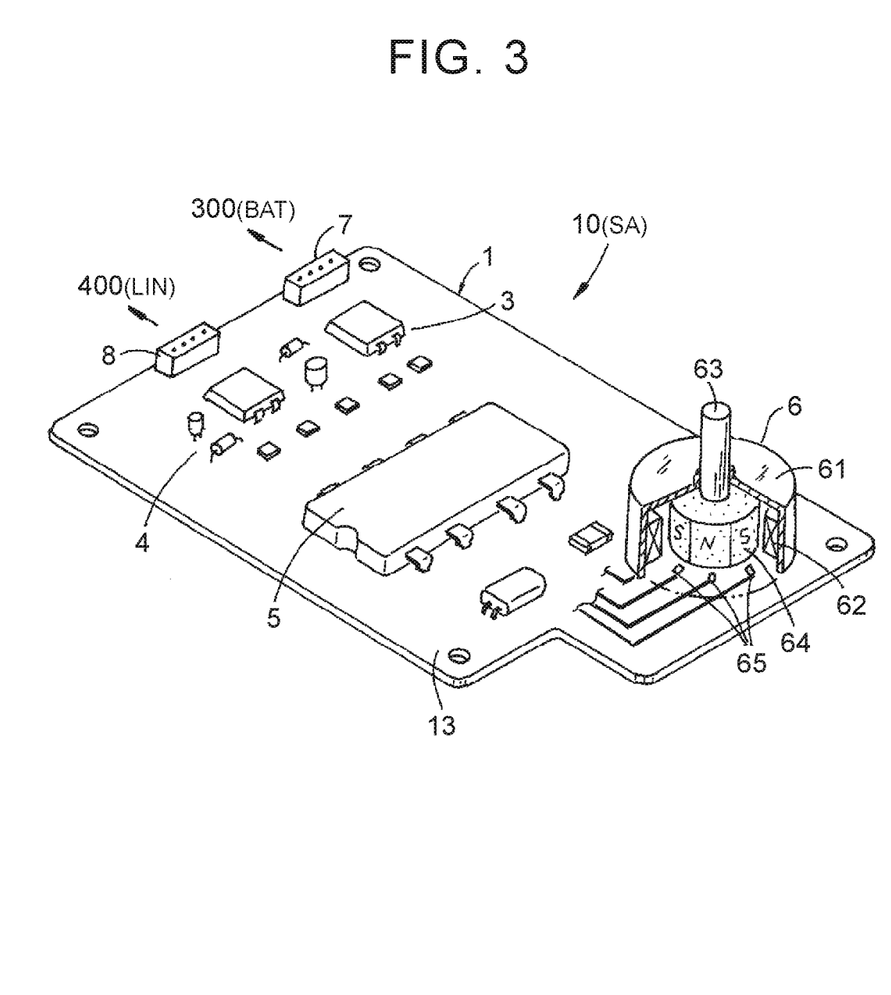
FIG. 3 is an external view showing the general configuration of a control unit.

Referring to the general configuration of the control unit 1 shown in FIG. 3, the control unit 1 is structured on a single control board 13. Various electronic components are mounted on this control board 13. These electronic components constitute the foregoing electric power supply IF unit 3 and the foregoing communication IF unit 4. Besides, the foregoing custom IC 5 is mounted on the control board 13. Furthermore, the motor 6 is integrally assembled with the control board 13.

The electric power supply IF unit 3 is connected to the BAT 300 via an electric power supply connector 7, converts an electric power fed from the BAT 300 into a predetermined voltage and a predetermined current, and functions as an electric power supply in driving the control unit 1.

The communication IF unit 4 is connected to the LIN via a signal connector 8, and is connected to the vehicle ECU 200. The control unit 1 receives a control signal from the vehicle ECU 200, and performs drive control of the motor 6 by the custom IC 5 based on this control signal. Besides, the control unit 1 transmits various information signals such as a rotational position of the motor, a swiveling position of the LU 100 that is closely related thereto, and the like to the vehicle ECU 200 through the LIN 400.

The motor 6 is configured as a brushless motor that is integrally assembled with the control board 13. As shown in a partially broken manner, this brushless motor is constituted of a stator 62 and a rotor 64. The stator 62 is configured as a drive coil that is internally mounted in a cylindrical container-shaped motor case 61 that is attached to the control board 13. The rotor 64 is configured as a magnet (a permanent magnet) that is integrally provided on a rotary shaft 63 that is axially supported by this motor case 61.

By inputting a driving current to respective drive coils as the stator 62 from the custom IC 5, this motor 6 is rotationally driven at a required number of revolutions or a required rotational speed. Besides, this motor 6 is mounted with a hall IC (a magnetism detection IC) 65 as a detection element for detecting rotation of the rotor 64, at a position facing the rotor 64 of the control board 13. By inputting rotation of the rotor 64 detected by this hall IC 65, namely, rotation information such as a rotation amount, a rotational speed and the like of the rotary shaft 63 to the custom IC 5, feedback control of the number of revolutions or rotational speed of the motor 6 can be performed.

Although not shown in the drawing, the output mechanism unit 2 that is coupled to the rotary shaft 63 of the motor 6 is configured as a gear train, a screw mechanism and the like. The output mechanism unit 2 is configured to change, more specifically, reduce the speed of the rotational output of the motor 6 and rotationally drive the output shaft 11. The motor 6 can normally and reversely rotate, and hence the output shaft 11 is also normally and reversely driven. Thus, swiveling control for turning the LU 100 in the horizontal direction in a reciprocating manner is performed as described previously.

Figure 4:
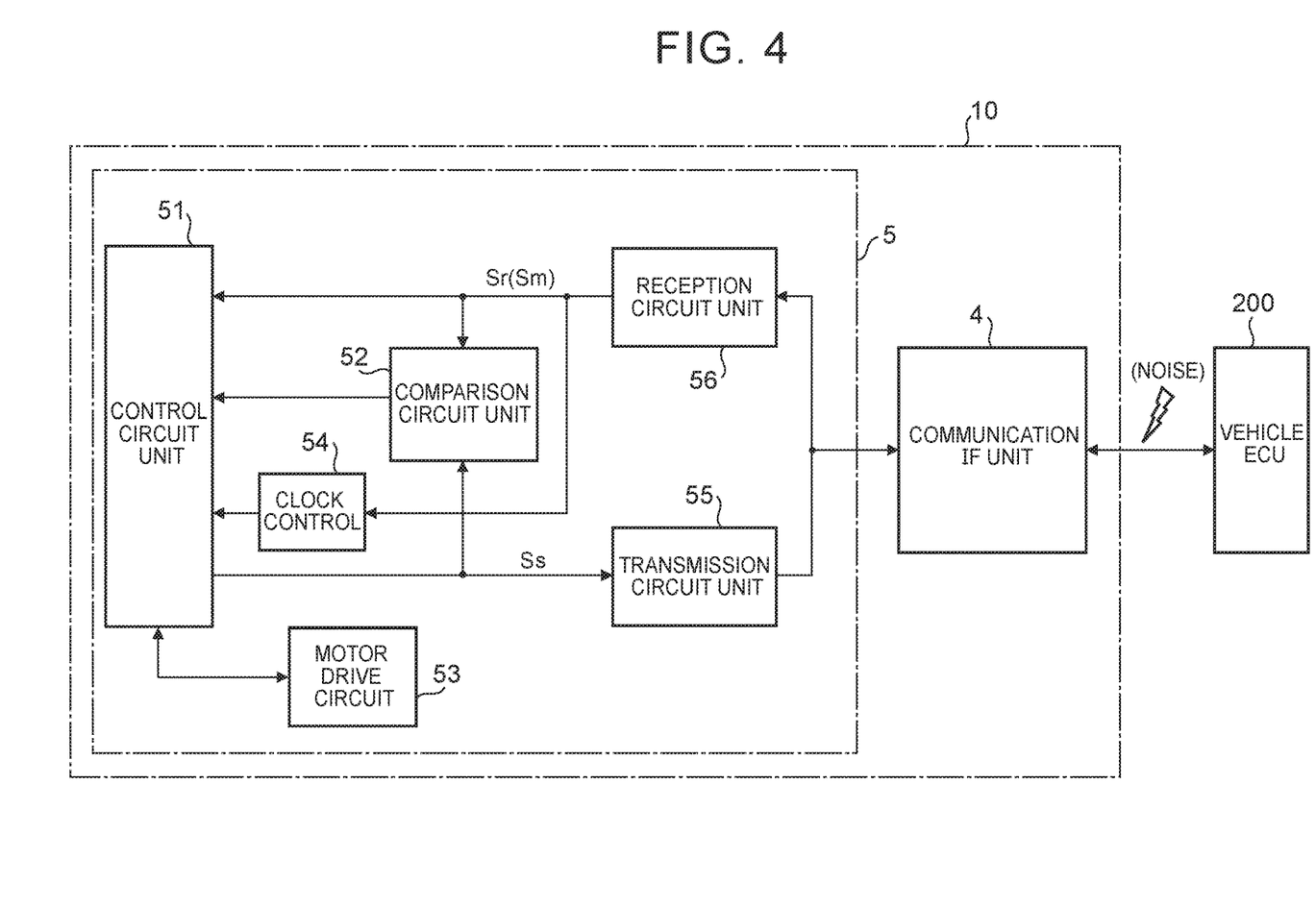
FIG. 4 is a block configuration view showing the internal configuration of a custom IC.

FIG. 4 shows the internal configuration of the custom IC 5. This custom IC 5 is equipped therein with a control circuit unit 51, a comparison circuit unit 52, a motor drive circuit unit 53, and a clock control circuit unit 54. Besides, the custom IC 5 is equipped with a transmission circuit unit 55 and a reception circuit unit 56, which are connected to the control circuit unit 51. This transmission circuit unit 55 and this reception circuit unit 56 are connected to the communication IF unit 4.

The control circuit unit 51 mainly has a function of transmitting/receiving a signal to/from the vehicle ECU 200 via the communication IF unit 4 and the LIN 400, and a function of controlling the driving of the motor 6. That is, when the reception circuit unit 56 receives a request signal of swiveling control information transmitted from the vehicle ECU 200, the control circuit unit 51 generates a transmission signal Ss of swiveling control information corresponding to this request signal, and outputs the transmission signal Ss to the transmission circuit unit 55. This transmission signal Ss generates a one-bit signal in one cycle of a clock signal generated by the clock control circuit unit 54, as a bit signal of "H" and "L".

Besides, when the reception circuit unit 56 receives a control signal for performing swiveling control (hereinafter referred to as a swiveling control signal) that is transmitted from the vehicle ECU 200, the control circuit unit 51 carries out a predetermined calculation based on this swiveling control signal, generates a motor control signal, and outputs the motor control signal to the motor drive circuit unit 53. Furthermore, a detection signal detected by the rotation detection element (the hall IC) 65 that is provided in the motor 6 is input to the control circuit unit 51 via the motor drive circuit unit 53, and feedback control of the motor control signal is performed based on this detection signal.

The motor drive circuit unit 53 generates a motor drive current based on a motor control signal that is input from the control circuit unit 51, drives the motor 6 by supplying this motor drive current to the motor 6, and performs swiveling control of the LU 100.

The reception circuit unit 56 receives the foregoing request signal, the foregoing swiveling control signal and the like transmitted from the vehicle ECU 200 via the communication IF unit 4, and outputs each of these signals to the control circuit unit 51 as a reception signal Sr. Besides, in transmitting the transmission signal Ss from the transmission circuit unit 55, the reception circuit unit 56 monitors and receives the transmitted transmission signal Ss. The reception signal Sr thus monitored and received is detected as a monitoring signal Sm.

The transmission circuit unit 55 outputs information on the motor control that is generated by the control circuit unit 51 based on a request signal from the vehicle ECU 200 and that is output, namely, the rotational position of the motor 6, or more specifically, the transmission signal Ss based on information such as the swiveling angle, swiveling speed and the like of the LU 100 to the communication IF unit 4, and transmits the transmission signal Ss toward the vehicle ECU 200 therefrom.

The comparison circuit unit 52 has a function of comparing the transmission signal Ss that is transmitted from the transmission circuit unit 55 and the reception signal Sr monitored and received by the reception circuit unit 56 in transmitting this transmission signal Ss toward the vehicle ECU 200 from the communication IF unit 4, namely, the monitoring signal Sm with each other. In this case, as will be described later, it is determined through comparison whether or not the level "H" or "L" of the transmission signal Ss and the level "H" or "L" of the monitoring signal Sm coincide with each other. If these levels do not coincide with each other, it is determined that there is an abnormal state.

Although the details of the clock control circuit unit 54 will be described later, the clock control circuit unit 54 generates a clock signal at a predetermined frequency, and outputs this clock signal to the control circuit unit 51. The control circuit unit 51 controls the timing for transmitting the transmission signal Ss based on this clock signal, and controls the timing for making a comparison in the comparison circuit unit 52. Besides, this clock control circuit unit 54 is configured to be able to control the timing of the clock signal based on the monitoring signal Sm received by the reception circuit unit 56.

Figure 5:
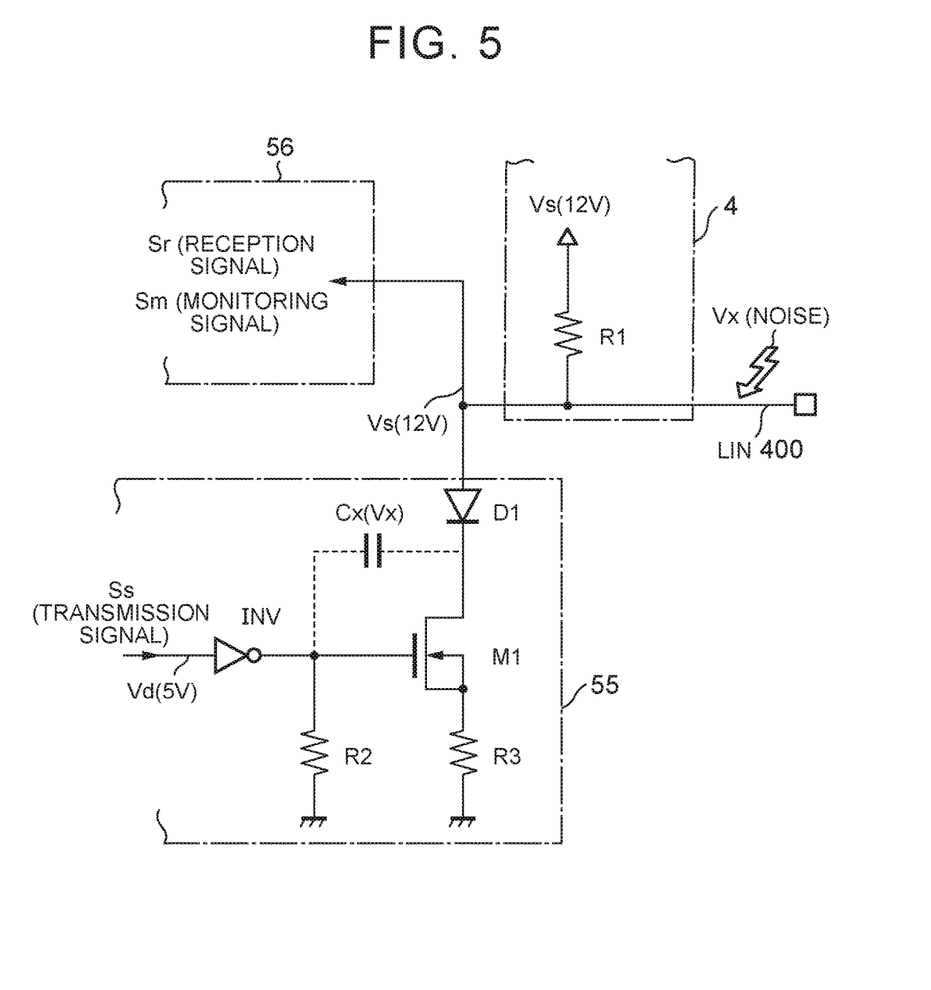
FIG. 5 is a circuit configuration view of a transmission circuit unit, a reception circuit unit, and a communication IF unit.

As shown in FIG. 5, the transmission circuit unit 55 is equipped with a level shift circuit. This level shift circuit is configured to include an inverter INV that inverts the transmission signal Ss to be transmitted, and an NMOS transistor M1 that is turned on/off by an output of this inverter INV. A drain of this NMOS transistor M1 is connected to the LIN 400 via a diode D1. The transmission signal Ss that is input to the inverter INV is a binary signal having a Vb level (a base level=5 V) and a Ve level (a ground level=0 V). Besides, in the communication IF unit 4, the LIN 400 is pulled up to a Vs level (=12 V) as an LIN transfer level by a pull-up resistor R1.

In this level shift circuit, when the transmission signal Ss is at the "H" level Vb (=5 V), the output of the inverter INV is "L", the NMOS transistor M1 is off, and the drain is shifted to the LIN transfer level Vs (=12 V). When the transmission signal is at the "L" level Ve (=0 V), the output of the inverter INV is "H", the NMOS transistor M1 is on, and the drain is at Ve (=0 V).

Accordingly, the monitoring signal Sm that is received by the reception circuit unit 56 is at the Vs level or the Ve level in such a manner as to correspond to the "H" level or "L" level of the output signal Ss. Besides, the reception circuit unit 56 is provided with a circuit for shifting the Vs level of the reception signal received through the LIN 400 to the Vb level, but the description thereof is omitted herein.

The SA 10 according to the disclosure is configured as described above. As shown in FIG. 2B, when a request signal is transmitted to the SA 10 assembled with the headlamp HL from the vehicle ECU 200 via the LIN 400, the reception circuit unit 56 receives this request signal through the communication IF unit 4, and outputs the received reception signal Sr to the control circuit unit 51. The control circuit unit 51 receives the request corresponding to this reception signal Sr, generates the transmission signal Ss including swiveling control information, outputs the transmission signal Ss to the transmission circuit unit 55, and transmits the transmission signal Ss to the vehicle ECU 200 from the communication IF unit 4 through the LIN 400.

The vehicle ECU 200 generates a swiveling control signal based on swiveling control information of the transmitted transmission signal Ss, and transmits the swiveling control signal to the SA 10 through the LIN 400. The SA 10 receives this swiveling control signal at the communication IF unit 4 and the reception circuit unit 56. The control circuit unit 51 generates a motor control current based on the received reception signal Sr, namely, the swiveling control signal, and outputs the motor control current to the motor drive circuit unit 53. Thus, predetermined rotation control of the motor 6 is performed, and the output mechanism unit 2 performs swiveling control of the LU 100.

In this swiveling control, the comparison circuit unit 52 monitors the transmission signal Ss. That is, as shown in the timing chart of FIG. 6, the transmission circuit unit 55 transmits the transmission signal Ss generated by the control circuit unit 51 in such a manner as to correspond to a request from the vehicle ECU 200, through the LIN 400 at a required timing. This transmission signal Ss is output as a bit signal that first falls to the "L" level, and then bit signals at the "H" or "L" level are sequentially output.

Figure 6:
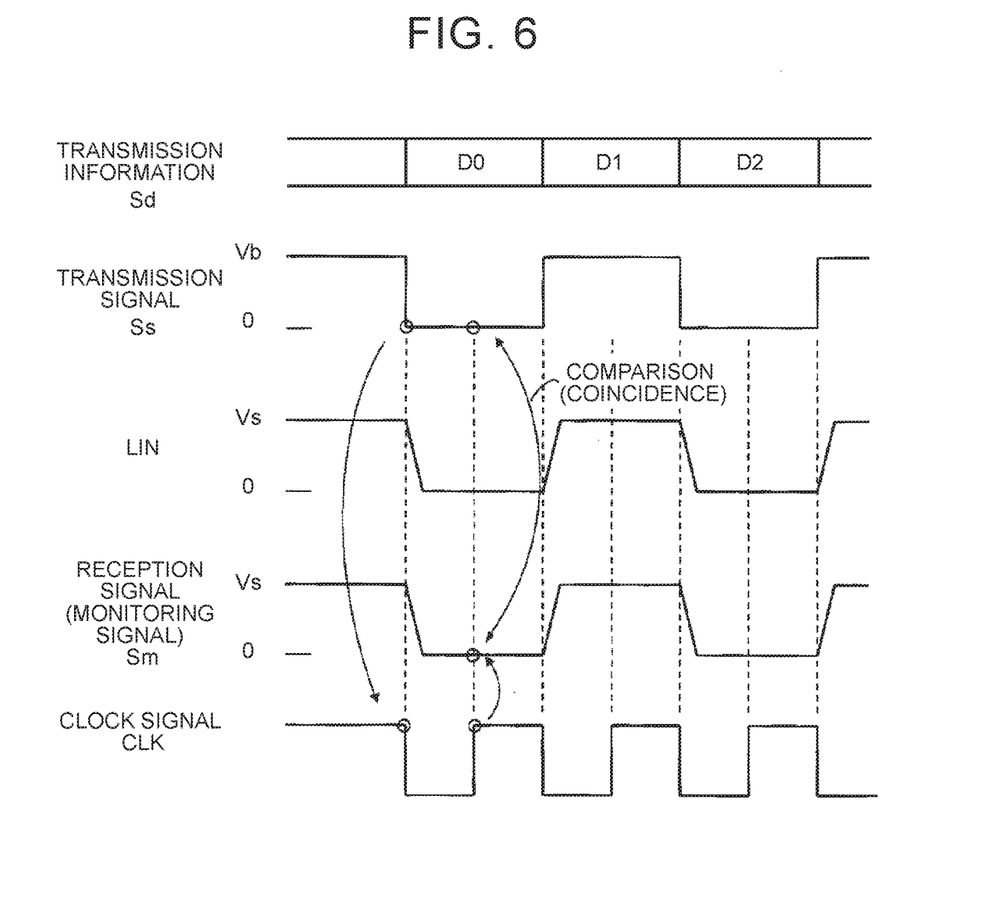
FIG. 6 is a timing chart of a monitoring operation in a normal state.

The clock control circuit unit 54 performs timing control of a clock signal CLK such that the clock signal CLK falls in synchronization with the fall of the transmission signal Ss. Besides, the reception circuit unit 56 receives the transmission signal Ss transmitted through the LIN 400, as the monitoring signal Sm through echo back. The comparison circuit unit 52 compares the level of the transmission signal Ss that has not been transmitted yet and the level of the received monitoring signal Sm with each other. This comparison is made at a timing when the clock signal CLK generated by the clock control circuit unit 54 first rises, and it is detected whether or not the levels of both the signals coincide with each other. In the example of FIG. 6, both the signals are at the "L" level, and it is determined that the comparison results in coincidence and that the transmission signal Ss is normal.

By the way, in the transmission circuit unit 55 shown in FIG. 5, if there is a parasitic capacitance Cx between a gate and drain of the NMOS transistor M1, namely, in a path that is connected to the LIN 400, an electric charge generated by external noise is accumulated in the parasitic capacitance Cx when this external noise is added to the LIN 400. For example, an electric charge corresponding to a Vx level (=30 V) that is much higher than Vs may be accumulated in the parasitic capacitance Cx. As a result, the drain voltage of the NMOS transistor M1, namely, the level of the LIN 400 is raised to Vx.

Figure 7:
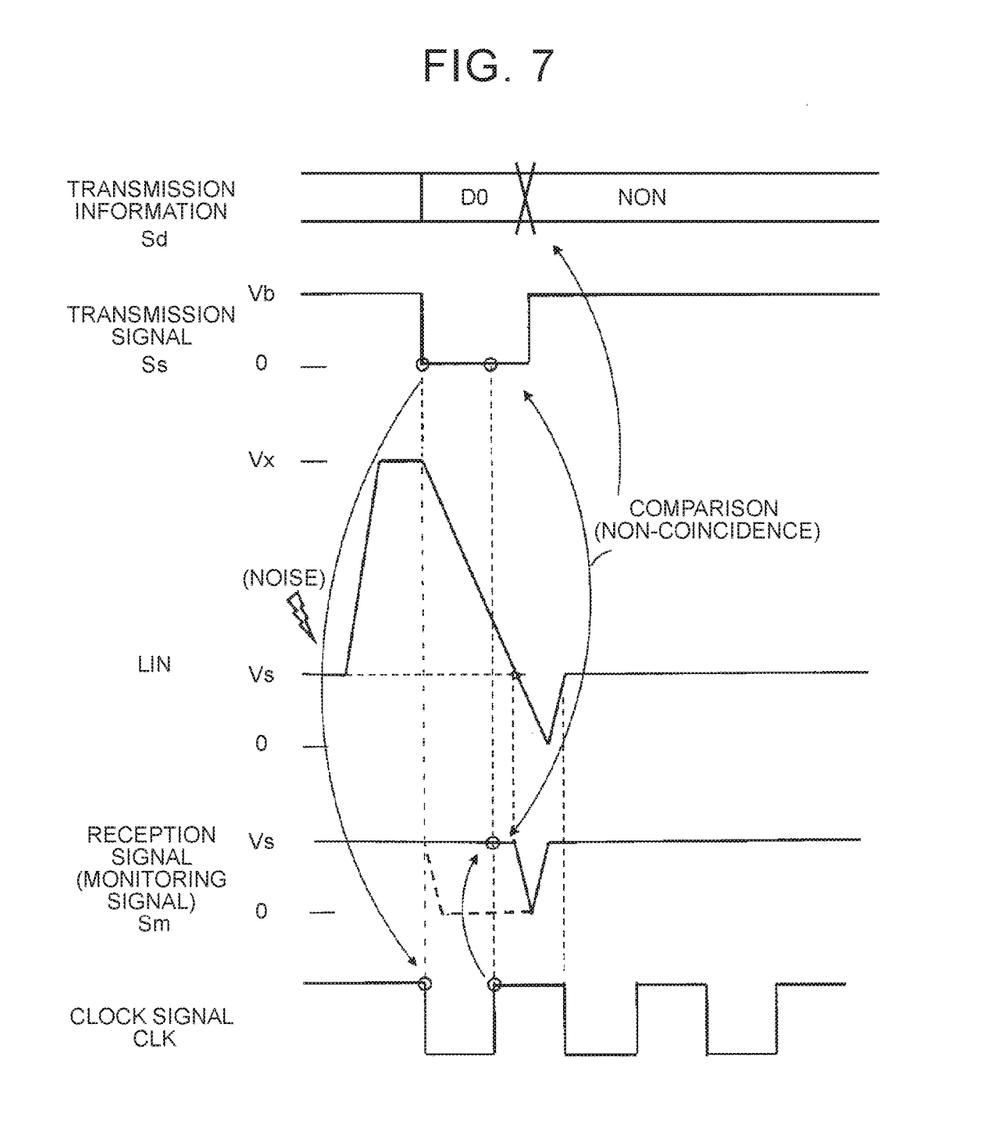
FIG. 7 is a timing chart of the monitoring operation in an abnormal state as a comparative example.

Therefore, as shown in FIG. 7, when the level of the transmission signal Ss changes from the "H" level to the "L" level, it takes a required time until the electric charge accumulated in the parasitic capacitance Cx is discharged, namely, until the level of the LIN 400 falls from Vx to Vs. Thus, the timing when the level of the monitoring signal Sm received by the reception circuit unit 56 falls to Ve is delayed, and the monitoring signal Sm has not reached the "L" level yet at the timing when the clock signal CLK first rises. Therefore, when the transmission signal Ss and the monitoring signal Sm are compared with each other at the timing when the clock signal CLK first rises, the levels of both the signals do not coincide with each other, so it is determined that there is an abnormal state.

In determining that there is an abnormal state due to non-coincidence between the levels of the transmission signal Ss and the monitoring signal Sm, the comparison circuit unit 52 outputs this abnormal state to the control circuit unit 51. In response, the control circuit unit 51 stops generating the transmission signal Ss, and also stops outputting the transmission signal Ss to the transmission circuit unit 55. That is, despite the outputting of the normal transmission signal Ss from the control circuit unit 51, it may be determined that there is an abnormal state due to a delay caused in the monitoring signal Sm, the transmission thereof may be stopped, and swiveling control may not be performed with accuracy afterward.

Figure 8:
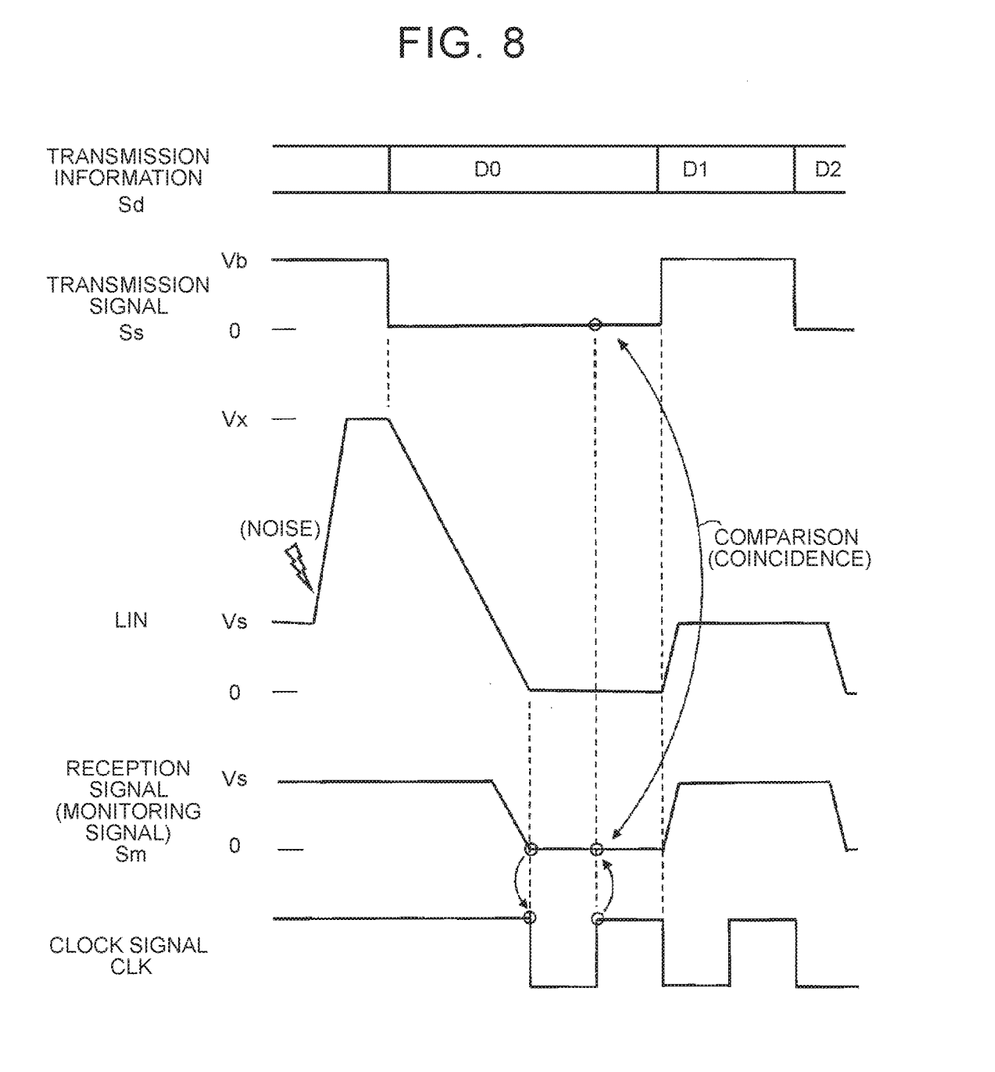
FIG. 8 is a timing chart of the monitoring operation according to the disclosure.

As a measure against this problem, in the present embodiment of the disclosure, the clock control circuit unit 54 is configured to perform timing control in such a manner as to synchronize the fall of the clock signal CLK at a timing when the monitoring signal Sm falls. That is, in the case where an electric charge is accumulated in the parasitic capacitance Cx due to noise added to the LIN 400 and the drain voltage of the NMOS transistor M1 has been raised to Vx, the fall of the clock signal CLK is synchronized with a timing when the monitoring signal Sm changes to the "L" level, even if the monitoring signal Sm falls to the "L" level with a delay.

The control circuit unit 51 outputs the transmission signal Ss to the transmission circuit unit 55 based on the clock signal CLK thus controlled. Accordingly, when the transmission signal Ss and the monitoring signal Sm are compared with each other at the timing of the first rise of this clock signal CLK, the transmission signal Ss is definitely at the "L" level at the timing of this comparison, and the monitoring signal Sm is also at the "L" level with the drain voltage of the NMOS transistor M1 equal to or lower than Vs. Therefore, the levels of both the signals coincide with each other, so it is determined that there is a normal state.

When the comparison circuit unit 52 thus determines that there is a normal state where the signal levels of the transmission signal Ss and the monitoring signal Sm coincide with each other, swiveling control information can be transmitted to the vehicle ECU 200 by continuing to transmit the transmission signal Ss. Accordingly, the SA 10 receives a suitable swiveling control signal from the vehicle ECU 200 and performs swiveling control in a favorable manner.

As described above, in the present embodiment of the disclosure, even in the case where the LIN 400 is influenced by noise and the monitoring signal Sm is delayed due to the parasitic capacitance Cx that exists in the transmission circuit unit 55, the clock signal CLK falls when the monitoring signal Sm falls. Therefore, when the monitoring signal Sm subsequently rises, the transmission signal Ss and the monitoring signal Sm can be compared with each other with the influence of the delay eliminated. Thus, when the normal transmission signal Ss is generated by the control circuit unit 51 and transmitted from the transmission circuit unit 55, the detection of an abnormality in the transmission signal Ss under the influence of the noise added to the LIN 400 is avoided. As a result, normal swiveling control is ensured.

In the illustrated embodiment of the disclosure, there is adopted a configuration in which the clock signal is synchronized with the fall of the monitoring signal when the monitoring signal changes to "L" and the transmission signal and the monitoring signal are compared with each other at the timing when the monitoring signal subsequently rises. On the contrary, however, the clock signal may be synchronized with the rise of the monitoring signal when the monitoring signal changes to "H", and the transmission signal and the monitoring signal may be compared with each other at the timing when the monitoring signal subsequently falls.

The embodiment of the disclosure presents an example in which the disclosure is applied to the SA, namely, the swiveling actuator. However, it goes without saying that the disclosure is applicable to a leveling actuator or a leveling/swiveling actuator.

What is claimed is:

1. A monitoring device comprising:
a comparison unit that is configured to compare a signal level of a transmission signal and a signal level of a monitoring signal that has received the transmission signal with each other at a timing synchronized with a clock signal; and
a clock control unit that is configured to detect the signal level of the monitoring signal and synchronize the clock signal with a timing when the signal level of the monitoring signal changes, wherein
the clock control unit is configured to synchronize a timing when the clock signal changes from a first level to a second level, when the signal level of the monitoring signal changes, and
the comparison unit is configured to compare the signal level of the transmission signal and the signal level of the monitoring signal with each other at a timing when the clock signal changes from the second level to the first level.

2. The monitoring device according to claim 1, wherein
the transmission signal is at a low level at a time of transmission,
the clock control unit is configured to synchronize the monitoring signal with a fall of the clock signal when the monitoring signal changes to the low level, and
the comparison unit is configured to compare the signal level of the transmission signal and the signal level of the monitoring signal with each other when the clock signal rises.

3. A light distribution control device for a lamp, including a vehicle ECU that is mounted in a vehicle and an actuator that is configured to perform light distribution control of swiveling and/or leveling of the lamp for the vehicle, the light distribution control device being configured to perform the light distribution control through transmission/reception of a signal between the vehicle ECU and the actuator, the light distribution control device characterized by comprising:
the monitoring device according to claim 1 that monitors a transmission signal that is transmitted to the vehicle ECU from the actuator.

4. The light distribution control device according to claim 3, wherein
the transmission signal is information on swiveling and/or leveling of the lamp for the vehicle.

* * * * *